United States Patent

[11] 3,542,396

| [72] | Inventor | Delmer James Hill<br>Grosse Pointe Woods, Michigan (3133<br>Cortland Drive, Vestal, NY 13850) |
|---|---|---|
| [21] | Appl. No. | 771,826 |
| [22] | Filed | Oct. 30, 1968<br>Continuation-in-part of Ser. No. 684,434,<br>Nov. 20, 1967, Patent No. 3,495,865. |
| [45] | Patented | Nov. 24, 1970 |

[54] SECTIONAL TRAILER
12 Claims, 15 Drawing Figs.

[52] U.S. Cl. ................................................ 280/411,
296/22
[51] Int. Cl. ..................................................... B60p 3/02
[50] Field of Search ........................................... 296/22, 26;
280/408, 409, 413, 460, 411, 412

[56] References Cited
UNITED STATES PATENTS

| 1,413,575 | 4/1922 | Cochran | 296/23UX |
| 2,113,448 | 4/1938 | Hewitt | 280/411 |
| 2,192,575 | 3/1940 | Hewitt | 280/411X |
| 3,119,638 | 1/1964 | Sneed | 296/23 |
| 3,162,459 | 12/1964 | Marmorine | 280/413X |
| 3,477,534 | 11/1969 | Ladwig | 280/400 |

*Primary Examiner*—Richard J. Johnson
*Attorney*—Hauke, Krass, Gifford & Patalidis ABSTRACT: A trailer structure formed of mobile trailer sections locked in side-by-side relationship for transport by a towing vehicle. Each section is independently mobile when separated from the other trailer sections, and has a sufficiently narrow width that allows its passage through a 36 inch wide passageway.

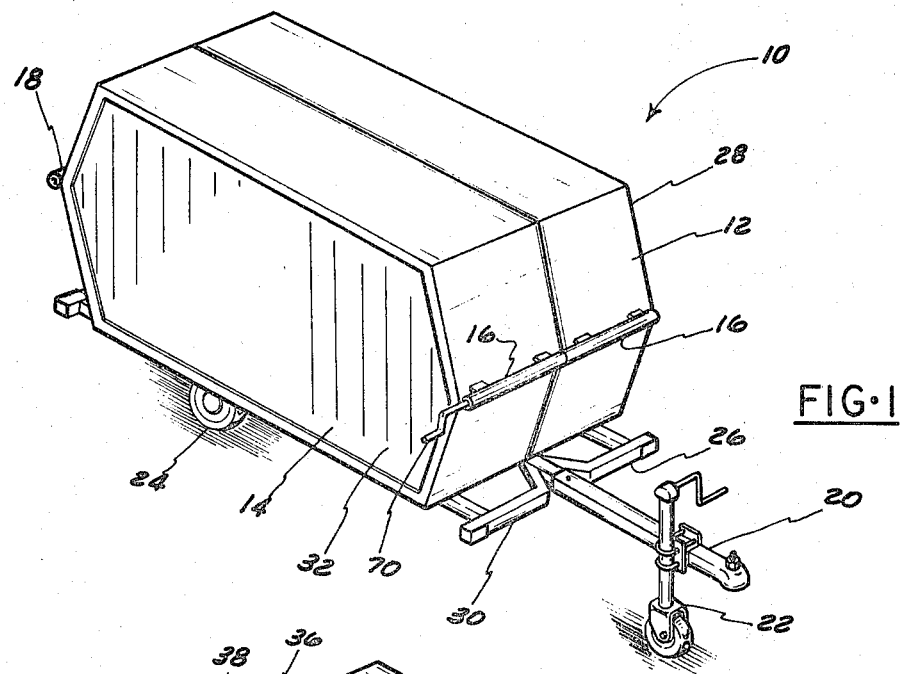
FIG·1
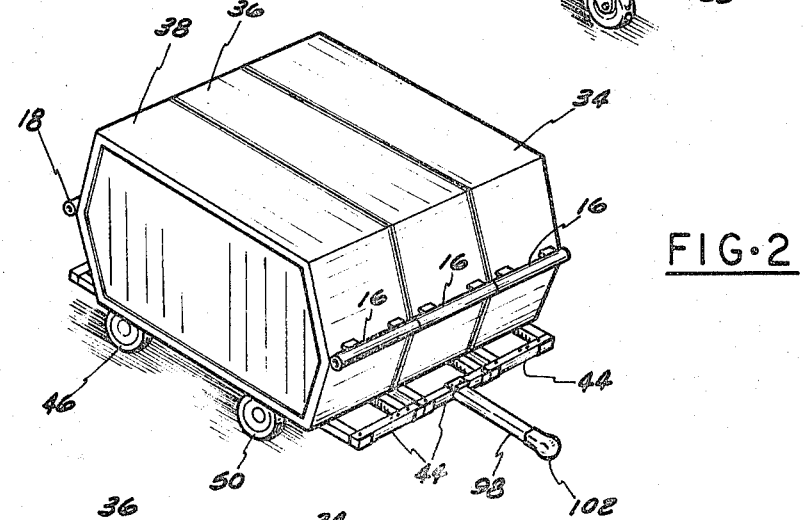
FIG·2
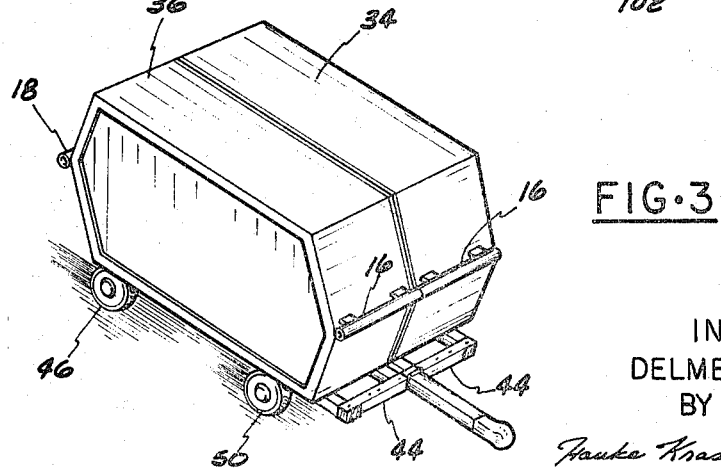
FIG·3
INVENTOR
DELMER JAMES HILL
BY
Hauke Kraus Gifford & Patalidis
Attorneys

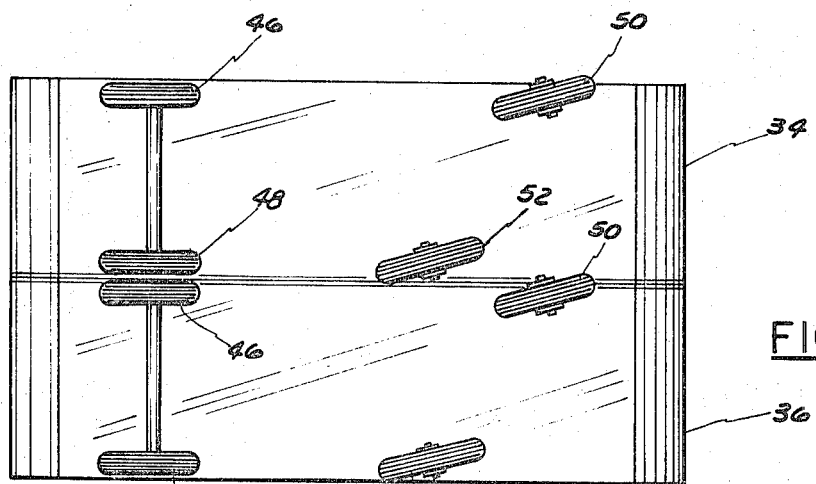
FIG·4
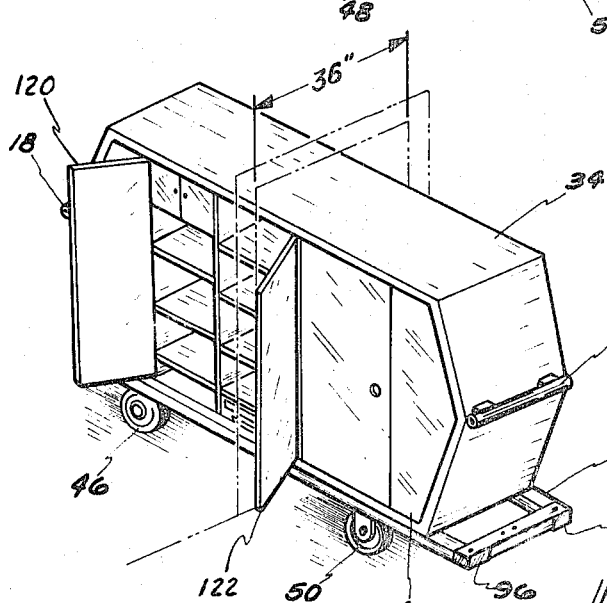
FIG·5
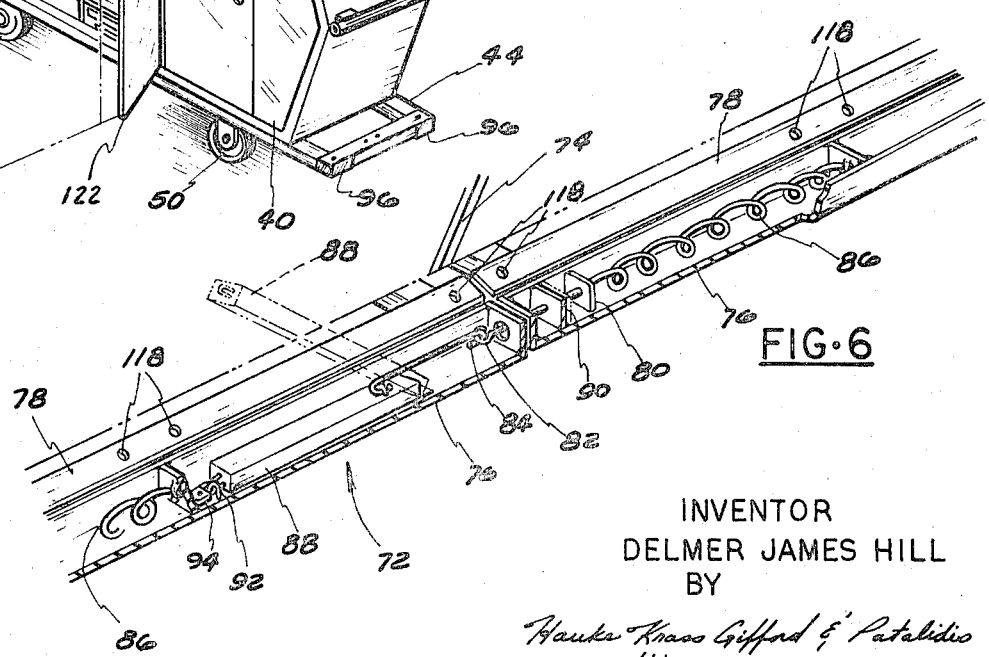
FIG·6
INVENTOR
DELMER JAMES HILL

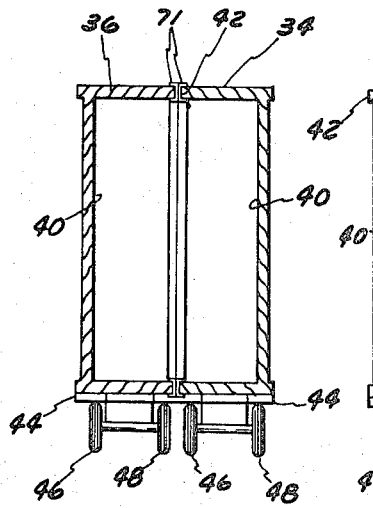
FIG·7
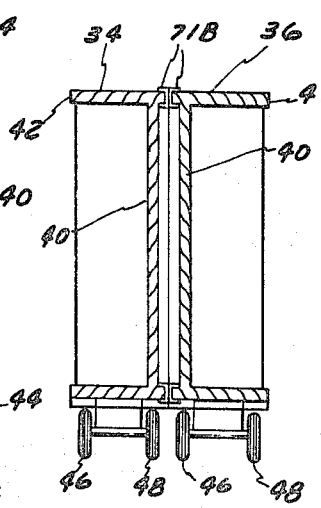
FIG·8
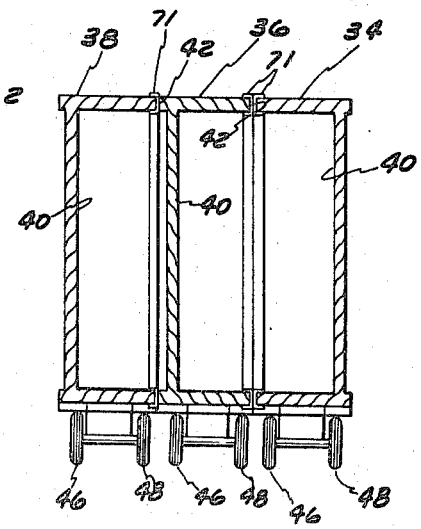
FIG·9
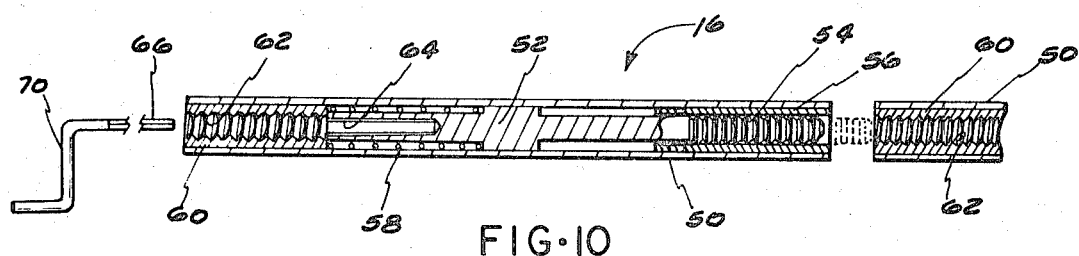
FIG·10
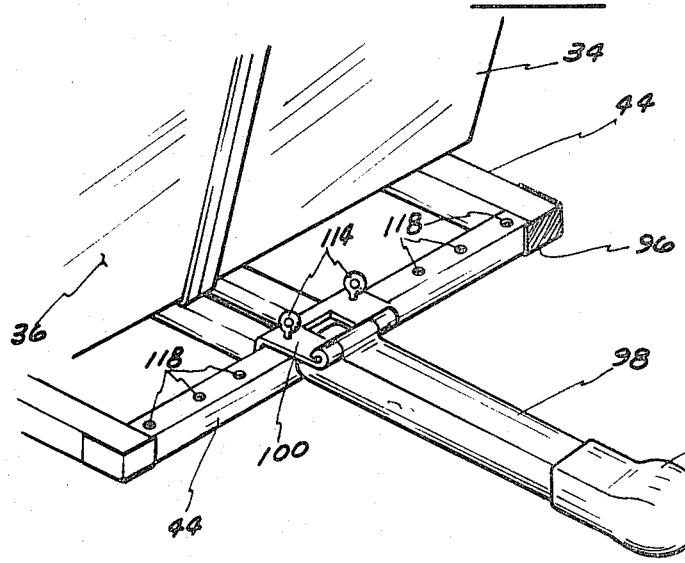
FIG·11
INVENTOR
DELMER JAMES HILL
BY
Attorneys

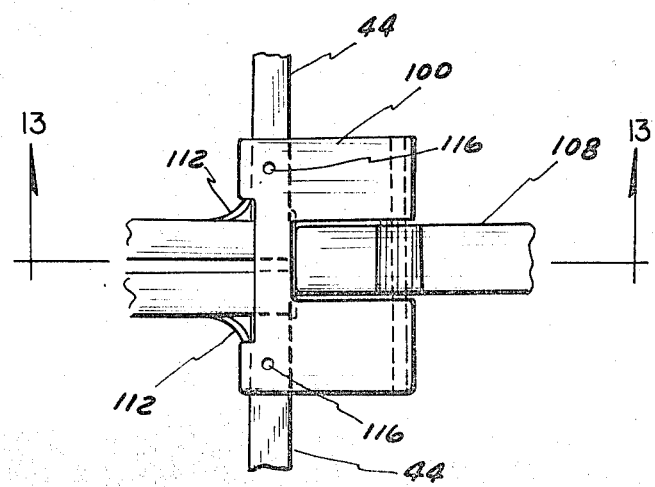
FIG·12
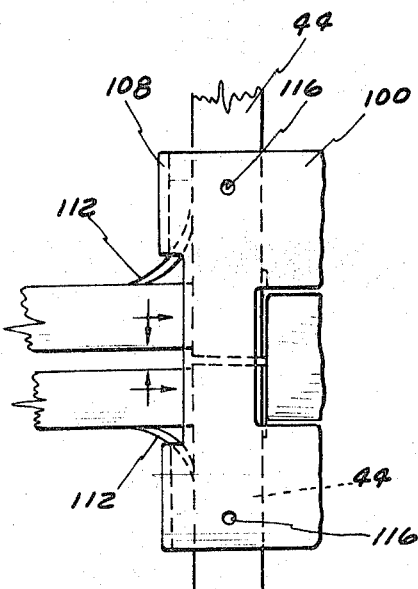
FIG·14
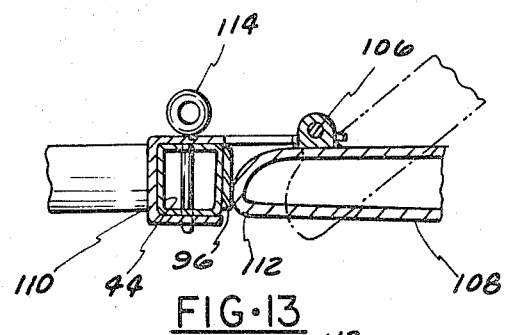
FIG·13
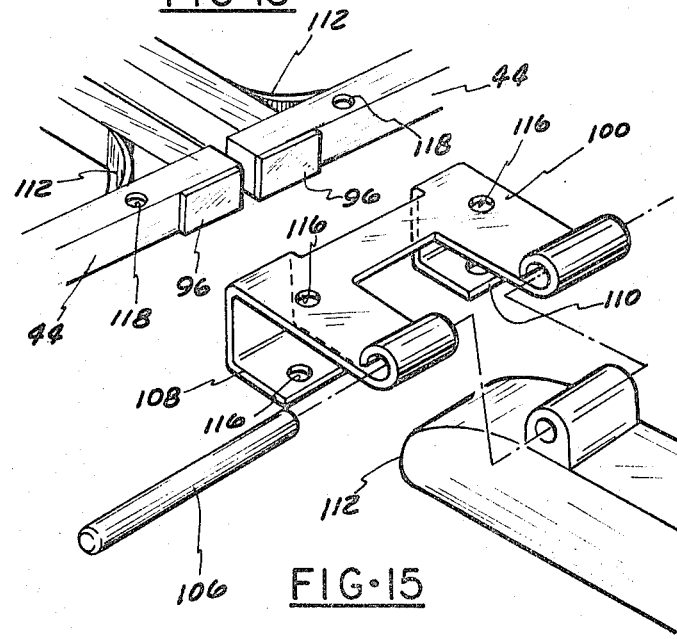
FIG·15

SECTIONAL TRAILER

CROSS REFERENCE TO RELATED APPLICATION

This application is a continuation-in-part of U.S. Pat. application Ser. No. 684,434 filed Nov. 20, 1967 and issued as U.S. Pat. No. 3,495,865 on Feb. 17, 1970.

BACKGROUND OF THE INVENTION

This invention relates to trailer structures, and more particularly to mobile trailer sections that can be locked in side-by-side relationship with one or more other trailer sections for towing by a vehicle.

Certain commercially prepared food products are conventionally prepared in one location, and then delivered by a suitable vehicle to another location for distribution to the ultimate consumer. Frequently one or both of the locations is in a building having passageways that do not have a sufficient width to allow passage of either a delivery vehicle or a trailer of conventional size. The food, therefore, is usually handled or otherwise carried from the point of preparation to the vehicle, and from the vehicle to the point of consumption.

My aforementioned copending application disclosed a sectional trailer structure that provides a reduction in such handling. The trailer structure divides into independently mobile sections, each of which has a relatively narrow width that allows it to be passed through a doorway having a conventional width of about 36 inches. When at least two of the trailer sections are joined together, in side-by-side relationship, they have sufficient stability to be safely towed on the highway.

The prior art discloses sectional trailers that are joined together in one configuration for towing, and oriented in another configuration when parked. However such trailer sections of the prior art are connected together in end-to-end relationship for towing. Such art is shown in U.S. Pat. Nos. 3,119,638; 3,157,427 and 3,233,935. The sections of my trailer are connected side-by-side for towing.

The broad purpose of the present invention is to disclose several improvements of the basic trailer structure concept disclosed in my copending application.

SUMMARY OF THE INVENTION

One of the objects of the present invention is to provide locking means for joining two or more sectional trailer units in a side-by-side towing position. The preferred locking means allow one trailer section to be connected in a towing position adjacent either lateral side of a second sectional trailer. The preferred locking means also allow at least three trailer sections to be connected together in side-by-side relationship as long as their overall width is within accepted legal standards for highway use. This is achieved by providing locking elements adjacent both lateral sides of each trailer section that can be matched with complementary locking elements adjacent the sides of any other trailer section. The preferred locking means are useful for connecting a pair of wheeled trailer frames in side-by-side relationship for towing purposes, as well as for connecting a pair of housings that are carried on wheeled frames.

The preferred embodiment comprises a series of three housings that function as mobile food catering units. Each trailer housing has a lateral opening that provides access to various food storage units for maintaining the food products in a prepared condition while being moved from a source to a point of distribution. The opening on one of the housings is on the opposite lateral side with respect to the openings of the other two housings so that when locked together for towing, the lateral opening of each housing is blocked by one of the other housings. This arrangement allows each trailer to be closed against unauthorized access while in a towing condition without additional closure structure such as a locked door.

Because of its narrow width, each mobile unit of the preferred trailer structure can be modified as a utility vehicle for purposes other than as a catering unit. For instance, each trailer housing can be adapted as a delivery vehicle for the conveyance of bakery products from the bakery to a market where, because of its configuration, it can be parked within the market to function as a display case.

A nonfood application of the preferred trailer structure is for the temporary installation of telephone booths at conventions, exhibits and the like. The present method of delivering such booths consists of delivering conventional phone booths to the exhibition building, hand-truck delivery of the booths through passage doors if the telephones are desired in locations that are inaccessible to motor vehicles, and then grouping of the booths to simplify their connection to temporary or existing phone lines. At the termination of the temporary demand, the process is essentially reversed, thereby consuming a considerable amount of unnecessary time. By subdividing a sectional trailer, built in accordance with my invention, into a series of booths equipped with the necessary telephone devices, a group of booths can be towed to the building, easily passed through conventional passageways and then quickly connected to the telephone line, thereby providing a substantial reduction in the time required in the installation of such booths.

Still other advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which:

FIG. 1 is a perspective view showing a trailer structure consisting of two trailer sections connected in towing position and illustrating one preferred embodiment of the invention;

FIG. 2 shows three trailer sections joined in side-by-side relationship for towing;

FIG. 3 shows an embodiment of the invention in which two trailer sections are connected together for towing but without the dolly of FIG. 1;

FIG. 4 is a bottom view of the embodiment of FIG. 3 showing the manner in which the forward wheels of each trailer section are offset to prevent interference with the forward wheels of an adjacent trailer section during a turning motion;

FIG. 5 is a view of the internal compartment of an individual trailer section, and illustrating the trailer section being passed through a doorway of conventional width;

FIG. 6 is a view showing one preferred locking means for joining a pair of trailers in a towing position;

FIGS. 7, 8 and 9 illustrate how one trailer section can be mounted adjacent either lateral side of another trailer section, and also how three trailer sections can be joined together to mutually close their internal compartments;

FIG. 10 is a longitudinal section through another locking means;

FIG. 11 is a perspective view showing a detachable towing member connected to a pair of trailer sections in their towing positions;

FIG. 12 is a fragmentary plan view of the towing member of FIG. 11;

FIG. 13 is a sectional view showing the manner in which the towing member can be raised or lowered between its release and locking positions;

FIG. 14 is another plan view illustrating the manner in which the towing member can be employed to cam a pair of trailer sections toward their towing position; and FIG. 15 is an exploded perspective view of the towing member and its associated coupling elements.

DESCRIPTION OF THE PREFERRED EMBODIMENTS

Now referring to the drawings, a preferred trailer structure 10 is illustrated in FIG. 1 as comprising a pair of trailer sections 12 and 14 joined together in side-by-side relationship in a towing position. Locking means 16 connect the forward ends of the two trailer sections together, and locking means 18, similar to locking means 16, join their rear ends together. A towing member 20, telescopically connected to the two trailer sections in their towing position, has a forward end adapted for connection to a towing vehicle (not shown).

As viewed in FIG. 1, the trailer structure 10 is shown in its parked condition with a dolly wheel 22 connected to the towing member 20 in such a manner as to cooperate with a pair of wheels 24 (only one of which is shown) on trailer section 14 and a similar pair of wheels (not shown) on the trailer section 12 to support the trailer structure in an upright position.

For purposes of description, the two trailer sections 12 and 14 are similar to one another except for a right- and left-hand relationship. The trailer section 12 has a wheeled frame 26 supporting a housing 28, while the trailer section 14 has a wheeled frame 30 supporting a housing 32. In their towing position, the housing 28 is locked to one lateral side of the housing 32 by locking means 16 and 18.

FIGS. 2 and 3 illustrate another preferred trailer structure in which three similarly shaped trailer sections 34, 36 and 38 are locked in a side-by-side towing position to one another by locking means 16 at their forward end, and locking means 18 at their rearward end. Each of the trailer sections 34, 36 and 38 has a relatively narrow width, however when locked together in a towing position as illustrated in FIG. 2, their combined width provides a structure that is stable for highway travel. Preferably the overall width of each trailer section is about 32 inches so any unit can be individually passed through a building doorway having a conventional width of about 36 inches.

As can best be seen in FIG. 9, each of the trailer sections 34, 36 and 38 has a housing defining an internal compartment 40 and an opening 42 in one lateral side that provides access into the compartment. The opening 42 in trailer sections 36 and 38 is in the opposite lateral side with respect to the forward end of the trailer as the opening 42 in trailer section 34. The openings are formed in such a manner that when one of the trailer sections is locked in a towing position access to the compartment 40 of any opening 42 between the two trailer sections, as well as to any of its subcompartments, is blocked. This provides means for preventing unauthorized entry into one or more of the trailer sections while they are temporarily parked either in transit or at their destination.

The locking means 16 and 18 allow each trailer section to be locked to either lateral side of any other similar trailer section in a towing position. For instance, the trailer sections 34 and 36 can be locked in a towing position in which their open lateral sides are adjacent one another, as illustrated in FIG. 7, or they can be locked in a towing position in which their closed lateral sides are adjacent one another. In either position, the two trailer sections are locked with their forward ends proximate one another. The forward end of each trailer section is taken with reference to the end that faces the towing vehicle while in transit.

Each trailer section has a frame 44 supported on a pair of rear wheels 46 and 48 which are mounted below the trailer housing and supported for rotation about a common axis that is transverse to the forward motion of the trailer. Each pair of rear wheels are preferably fixed against swiveling motion with respect to their frame 44.

Each trailer section also has a pair of forward wheels 50 and 52 which are connected to its frame 44 in positions between the rear wheels 46 and 48 and the forward end of the trailer section. The forward wheels 50 and 52 are mounted such that they can be swivelled as the structure is moved in a turn. In order to eliminate interference in the turning motion of the forward wheels of adjacent trailer sections, the wheel 52 is mounted rearward of the wheel 50. This offset mounting arrangement allows the forward wheels to be mounted closely adjacent the lateral sides of the frame 44 which, in turn, allows each trailer section to be stable when separated from another trailer section even though it has a relatively large height-to-width ratio.

Referring to FIG. 10, the locking means 16 comprises a tube 50 mounted on each trailer section with its opposite open ends adjacent opposite lateral sides of the trailer housing. Each tube 50 is slightly spaced from the housing to allow sufficient finger clearance so that it can be used as a handle. A male connecter 52 is mounted in each tube 50 for sliding motion between a fully retracted position, illustrated in FIG. 10, in which the connecter 52 is entirely enclosed by the tube 50, and an extended position in which a threaded end 54 of the connecter projects beyond one end of the tube and the side of the trailer housing.

An elongated bushing 56, mounted adjacent one end of each tube 50, provides a guide for the threaded end 54 and also functions as a stop to limit motion of the connecter 52 toward its fully extended position. A spring 58 connected between the connecter 52 and the tube 50 biases the connecter toward its fully retracted position. A female connecter 60, fixedly mounted adjacent the opposite end of the tube, has a threaded socket 62 that is formed complementary to the threaded end 54 of the connecter 52.

The male connecter 52 has an opening 64 for receiving and engaging the splined end 66 of a tool 70 that is passed through the open end of the tube and the socket 62 when the two trailer housings are being joined together. The tool 70, upon bottoming in the opening 64, allows the user to push the connecter 52 from its fully retracted position to an extended position in which the threaded end 54 is in contact with the female connecter 60 of an adjacent trailer. The tool 70 is then rotated to rotate the connecter 52 and threadably mate the two complementary connecters until the connecter 52 abuts the inner end of the bushing 56. Continued rotation of the tool draws the two trailer housings toward one another until they are in abutment and securely joined together. Since the locking means 16 has a complementary locking element adjacent each lateral side of the trailer housing, any trailer section can be locked to either lateral side of another similar trailer section. The locking means 18 at the rear end of each preferred trailer section is similar to the locking means 16 in that they allow any trailer section to be locked adjacent either lateral side of another trailer section with the forward ends of the two units proximate one another.

In FIG. 7, a rubber seal 71 is shown mounted about the perimeter of the open sides of trailer section 34 and 36 so that they lock together to form a sealed enclosure. In FIG. 7, a seal 71 B is shown mounted about the perimeter of the closed sides of trailer sections 34 and 36 to prevent metal-to-metal contact between them when joined together in this configuration.

Another locking device 72 having both female and male connecters is illustrated in FIG. 6 and provides means for joining one trailer section to either lateral side of another trailer section in a towing position. The locking device 72 acts as a bumper as well as the end of a trailer frame, however, it can be mounted directly on the trailer housing similar to locking means 16. As illustrated in FIG. 6, locking means 72 is mounted on the forward end of the frame of a trailer housing 74 and comprises an elongated metal case 76 having a cover 78 that can be raised to an open position to expose the locking elements or lowered to a closed position to enclose the locking elements. The locking elements include a piston 80 on one trailer, having an eye 82 that can be extended for connection to a hook 84 carried on the frame of an adjacent trailer. A spring 86 biases the piston 80 toward a fully retracted position within the case. However, when the cover 78 is opened, the user can extend the eye 82, against the bias of the spring 86, to form a connection with the hook 84.

A lever 88 is pivotally connected to the case 76 in such a manner that it can be raised and lowered between a pair of pivoted positions. In its raised position, the lever allows the hook 84, of one trailer section, to be connected with the eye 82 of an adjacent trailer section. As the lever 88 is lowered, it pulls the eye 82, against the bias of the spring, toward an extended position until the piston 80 abuts a stop 90. Further lowering of the lever draws the two trailer sections toward one another until their respective housings are in abutment.

In its fully lowered position, the outer end of the lever 88 can be locked to a fastener 92, carried on the case 76, by padlock 94 to prevent the locked trailers from being separated by an unauthorized party. It is to be noted that locking arrangement 72, like the locking arrangement 16, has both male and female connecters mounted adjacent opposite lateral sides of the trailer housing.

In addition to allowing a pair of trailer sections to be locked in alternative towing positions, both of the locking means 16 and 72 provide a high mechanical advantage for joining together adjacent trailer sections.

Referring to FIGS. 11 and 15, the corners of each frame 44 are provided with rubber pads 96 for protecting the legs of pedestrians who may contact the frame when the trailer structure is parked, as well as door jambs and walls when the trailer sections are being moved.

A towing member 98 is connected to the forward, adjacent corners of the frames of trailer sections 34 and 36. A coupling 100 connects the inner end of the towing member 98 to the two trailer sections and allows the towing member 98 to be quickly detached from the frames 44 of the two trailer sections. When detached from the trailer frames, the towing member 98 does not provide a hazard to pedestrians when the trailer section is parked and employed for catering or similar purposes in which a large number of people are moving about the trailer. A hitching member 102, carried on the outer end of the towing member 98, provides means for connecting the towing member to a complementary hitching member (not shown) carried on a towing vehicle.

FIG. 13 illustrates the curved shape of the inner end of the towing member 98 and the manner in which it is connected by pin 106 to the coupling such that the towing member can be pivoted between a raised position for either mounting or separating the coupling 100 from the trailer frames, and a lower, generally horizontal position for towing. The coupling 100 has a pair of jaws 108 and 110, each of which is formed to embrace the forward end of the trailer frame. The coupling 100 is initially mounted on the frame with the jaws 108 and 110 being spaced rearwardly of the frame's forward end with the towing member 98 in an upright position. As the towing member is lowered, its inner end engages the frame to pull the jaws forwardly around the frames.

Referring to FIGS. 12 and 14, a cam 112 is mounted adjacent each forward corner of the frames 44. The cams 112 are formed such that they slidably engage the inner side edges of the jaws 108 and 110 as the towing member 98 is lowered. The jaws and the cams thereby cooperate in camming the two frames toward one another as the towing member is lowered to its towing position. This arrangement allows the coupling to be mounted on the frames when they are slightly spaced from one another, and then employed to move them together.

When the towing member 98 is in its horizontal towing position, with the two trailer frames locked together, a pair of bolts 114 are dropped through a pair of suitable openings 116 in the coupling that are alined with openings 118 in the trailer frames to lock the coupling in position. The openings 118 are provided in four places on each end of each frame to accommodate the coupling 100 whether it be connected to the corners of two trailers in a dual trailer combination, as in FIG. 2, or to the center of the middle trailer of a three-trailer combination, as in FIG. 3.

When the trailer structure has arrived at its destination, the towing member 108 can be quickly detached from the frames of the two trailer sections by removing the bolts 114 and then raising the towing member 98 to its upright position for separating the coupling 100 from the trailer frames.

FIG. 5 illustrates the trailer section 34 being passed through a doorway having a conventional 36 inch width. The interior compartment 40 of the trailer section is internally compartmented to function as a catering unit. The various compartments provide storage for prepared food products, as well as for refrigeration and heating devices for maintaining the food products in a prepared state ready for consumption at the point of distribution, and miscellaneous related necessities such as paper plates, cups, napkins, etc. A pair of doors 120 and 122 provide closures for refrigerated, insulated portions of the compartment.

It is to be understood, however, that the particular internal compartmentation of the trailer section 34 is not intended to be limiting but that the trailer housing could also be subdivided to provide a mobile, multiple telephone booth unit, or formed into a delivery and display unit for other types of food stuffs, such as bakery products. Other useful configurations are also possible where a mobile trailer unit can be employed as a delivery vehicle that is suitable both for highway travel and for passage through a relatively narrow passageway which cannot pass a conventional motor vehicle. When three trailer sections are towed together, one of the trailer units can be parked at an intermediate location with the two remaining units, because of their stable, locked condition, being towed to a final destination.

The housing of the preferred trailer sections can be formed by any of a variety of relatively inexpensive mass production techniques. For instance, the housings could be molded of a cellular plastic having suitable insulation properties for maintaining food products in either a warm or a cold state.

Preferably, the overall width of each trailer section is about 32 inches with the frame and the wheels being contained within the housing profile. The particular housing and frame configurations are merely illustrative of many possible designs. Running lights, brake lights, turn lights and the like, can be mounted on each trailer section to comply with any vehicle regulations.

I claim:

1. A trailer structure, comprising:
   a. a first trailer housing having wheel means;
   b. a second trailer housing having wheel means, and being disposed in a towing position adjacent and abutting a substantially correspondingly profiled lateral side of the first trailer housing;
   c. a towing member disposed forwardly and centrally with respect to said housing, suited for connection to a towing vehicle, and means connecting the towing member to the first and second trailer housings for moving them together in forward motion; and
   d. locking means releasibly connected between said trailer housings to prevent motion of the first trailer housing with respect to the second trailer housing at such times as they are being moved together in forward motion.

2. A trailer structure as defined in claim 1, in which the locking means comprise a first pair of complementary locking members carried by the first trailer housing, and a second pair of complementary locking members carried by the second trailer housing, the locking members in each pair being formed such that one of the first pair is engageable with one of the second pair to lock the two housings together against separation when the second trailer housing is adjacent one lateral side of the first trailer housing, and the other of the first pair is engageable with the other of the second pair to lock the two housings together against separation when the second trailer housing is adjacent the opposite lateral side of the first trailer housing.

3. A trailer structure as defined in claim 1, in which the means connecting the towing member to the trailer housings comprises a cam member carried on one of the trailer housings; a coupling carried by the towing member, the coupling being engaged with the cam member such that as the towing member is moved in a predetermined motion with respect to the trailer housings, the second trailer housing is cammed toward said towing position adjacent the first trailer housing.

4. A trailer structure as defined in claim 1, in which the wheel means of each of said trailer housings include a pair of forward wheels mounted for swiveling motion, each pair of forward wheels being disposed adjacent opposite lateral sides of its trailer housing, one wheel of each pair being mounted rearwardly of the other wheel such that the forward wheels of adjacent sides of the first and second trailer housings can be swiveled without interfering one with the other at such times as the trailer housings are locked together.

5. A trailer structure as defined in claim 1, in which the locking means comprises a male connecter and a female connecter mounted on each of said trailer housings, the female connecter on each trailer housing being complementarily formed with respect to the male connecter on the other trailer housing, and being disposed such that one of the male connecters is receivable in a locking connection with a female connecter when the first trailer housing is disposed in a towing position adjacent wither side of the second trailer housing.

6. A trailer structure as defined in claim 5, including a tube mounted on one of the trailer housings to provide a handle for moving the housing, and wherein a female connecter and a male connecter are slideably disposed in the tube.

7. A trailer structure as defined in claim 5, in which the male connecter is elongated, supported for motion along its longitudinal axis, and has a threaded end; and the female connecter comprises a socket having an internally threaded opening for receiving and forming a connection with the male connecter.

8. A trailer structure as defined in claim 7, including a tool formed to be passed through the opening in the socket to provide a connection with the male connecter for moving it toward an extended position.

9. A trailer structure as defined in claim 5, in which one of the connecters comprises a hook, the other connecter comprises an eye, and including a movable lever connected to one of the connecters in such a manner that when the hook on one housing is engaged with the eye on the other housing, the two housings are moved toward one another as the lever is moved with respect to one of the housings.

10. A trailer structure, comprising:
a. a first trailer housing having wheel means;
b. a second trailer housing having wheel means, and being disposed in a towing position adjacent and abutting one lateral side of the first trailer housing, the second trailer housing being adapted to be disposed in another towing position adjacent the opposite lateral side of the first trailer housing;
c. a towing member disposed forwardly and centrally with respect to said housings, suited for connection to a towing vehicle, and means connecting the towing member to the first and second trailer housings for moving them together in forward motion;
d. locking means carried on said trailer housings to releasibly connect them together to prevent motion of the first trailer housing with respect to the second trailer housing when they are being moved together; and
e. the locking means being adapted to releasibly connect the two trailer housings together at such times as the second trailer housing is disposed in a towing position adjacent the opposite lateral side of the first trailer housing.

11. A trailer structure as defined in claim 10, including a third housing having supporting wheel means for forward motion, and means for locking the third housing to a lateral side of one of the other housings in a towing position, and wherein the towing member is suited for connection to the housings such that the three housings can be towed as a unit.

12. A trailer structure as defined in claim 10, in which each housing is formed to be passed through a 36 inch wide doorway.